United States Patent
Koguchi et al.

(10) Patent No.: US 8,319,789 B2
(45) Date of Patent: Nov. 27, 2012

(54) IMAGE GENERATION DEVICE AND IMAGE GENERATION METHOD

(75) Inventors: Takahiro Koguchi, Tokyo (JP); Norio Takama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 759 days.

(21) Appl. No.: 11/547,449

(22) PCT Filed: Apr. 13, 2005

(86) PCT No.: PCT/JP2005/007137
§ 371 (c)(1),
(2), (4) Date: Jan. 18, 2007

(87) PCT Pub. No.: WO2005/101320
PCT Pub. Date: Oct. 27, 2005

(65) Prior Publication Data
US 2008/0094409 A1    Apr. 24, 2008

(30) Foreign Application Priority Data
Apr. 13, 2004  (JP) ................................. 2004-118328

(51) Int. Cl.
G09G 5/02    (2006.01)
G06G 5/00    (2006.01)

(52) U.S. Cl. ........ 345/602; 345/582; 345/589; 345/600; 345/601

(58) Field of Classification Search .................. 345/428, 345/582, 587
See application file for complete search history.

(56) References Cited

U.S. PATENT DOCUMENTS

| | | | |
|---|---|---|---|
| 5,097,427 A | * | 3/1992 | Lathrop et al. ................. 345/587 |
| 5,495,563 A | * | 2/1996 | Winser ........................... 345/582 |
| 5,886,705 A | * | 3/1999 | Lentz ............................. 345/582 |
| 5,956,431 A | * | 9/1999 | Iourcha et al. ................. 382/253 |
| 6,191,793 B1 | | 2/2001 | Piazzo et al. |

FOREIGN PATENT DOCUMENTS

| | | |
|---|---|---|
| JP | 11-339072 A | 12/1999 |
| JP | 2000-155851 A | 6/2000 |
| JP | 2000155851 A * | 6/2000 |
| JP | 2002-32779 A | 1/2002 |

OTHER PUBLICATIONS

Marty Hall, J. Paul McNamee, "Improving Software Performance with Automatic Memoization", 1997, Johns Hopkins APL Technical Digest, vol. 18, No. 2, pp. 254-260.* Written Opinion from the International Searching Authority from the corresponding International Application PCT/JP2005/007137.
International Preliminary Examination Report on Patentability(II) from the corresponding International Application PCT/JP2005/007137.
Notification of Reason(s) for Refusal dated Jul. 1, 2008, from the corresponding Japanese Application.

* cited by examiner

*Primary Examiner* — Ulka Chauhan
*Assistant Examiner* — Robert Bader
(74) *Attorney, Agent, or Firm* — Katten Muchin Rosenman LLP

(57) ABSTRACT

A calculation unit (58) references texture data (62) in a storage unit (60) and acquires texel information of index color formal An integral look-up table (64) has a structure containing a plurality of color look-up tables based on the detail degree (LOD) of the area to be plotted A look-up table reference unit (70) selectively references the color look-up table based on the LOD stored in the integral look-up table (64) according to the LOD value of the texel obtained by the LOD calculation unit (68), acquires color information corresponding to the index value of the texel, and outputs it to the calculation unit (58). The calculation unit (58) performs filter processing such as bi-linear interpolation according to the texel color information and outputs the texel information after the processing.

13 Claims, 10 Drawing Sheets

| $R_1$ | $G_1$ | $B_1$ | $\alpha_1$ |
|---|---|---|---|
| $R_2$ | $G_2$ | $B_2$ | $\alpha_2$ |
| $R_3$ | $G_3$ | $B_3$ | $\alpha_3$ |
| ⋮ | ⋮ | ⋮ | ⋮ |
| $R_{256}$ | $G_{256}$ | $B_{256}$ | $\alpha_{256}$ |

⎫ 256 ENTRIES

| $R_1$ | $G_1$ | $B_1$ | $\alpha_1$ |
|---|---|---|---|
| $R_2$ | $G_2$ | $B_2$ | $\alpha_2$ |
| ⋮ | ⋮ | ⋮ | ⋮ |
| $R_{16}$ | $G_{16}$ | $B_{16}$ | $\alpha_{16}$ |

⎫ 16 ENTRIES

IMAGE GENERATION DEVICE AND IMAGE GENERATION METHOD

This application is a National Phase Application of International Application No. PCT/JP2005/007137, filed Apr. 13, 2005, which claims the benefit under 35 U.S.C. 119 (a-e) of Japanese Application No. 2004-118328 filed Apr. 13, 2004, which is herein incorporated by reference.

TECHNICAL FIELD

The present invention relates to an image generating apparatus and an image generating method for generating image data.

BACKGROUND TECHNOLOGY

In 3D computer graphics, a polygon model, in which 3D objects are generally represented by a larger number of polygons, is employed. In rendering objects using a polygon model, shading is performed in which the surface of polygons are shaded in consideration of light sources, view points and the reflectivity of objects' surfaces. In order to generate a photorealistic image, texture mapping, in which a texture image is mapped to the surface of polygon model, is performed.

In order to reduce the volume of data for texture images, the index color scheme is sometimes employed in which indexes representing color values are provided instead of providing each texel with a color value. A color lookup table is referred to at the time of texture mapping so that the index is converted into an actual color value. The color lookup table is alternatively referred to as a color palette. A color sample in which color values are defined is provided in the form of a color lookup table or a color palette, allowing a texel to store only index information for referring to a color lookup table. For example, given that a color sample used comprises 256 colors, each texel in a texture image has only to store an index of 8 bits. Given a color sample of 16 colors, a texel has only to store an index of 4 bits. Thus, the volume of data for texture images is remarkably reduced.

In texture mapping using a texture image provided in the index color format, the size of a color lookup table should be as small as possible for efficient use of memory. In order to maintain high rendering quality, however, a certain number of colors are necessary in a color sample. On the other hand, the number of colors can be small for an area that need not be rendered in great detail. A general approach is to provide a single, large color lookup table to accommodate a larger number of colors. Then, the same palette is equally used for indexing of color values even in an area that need not be rendered in great detail, resulting in less efficient use of memory.

DISCLOSURE OF THE INVENTION

In this background, a general purpose of the present invention is to provide an image generating apparatus and an image generating method capable of performing a graphic process efficiently in respect of storage capacity and volume of calculation.

An image generating apparatus according to one embodiment of the present invention comprises: an integrated lookup table formed such that a single storage area is divided into a plurality of blocks and individual lookup tables are respectively assigned to the plurality of blocks; and a reference unit which selectively refers to one of the individual lookup tables in the integrated lookup table by designating the location of one of the plurality of blocks in the integrated lookup table so as to acquire reference information necessary for operation for generating an image. The term "reference information" refers to various information, such as color information and function values, referred to in an operation for generating an image. The term "color information" is a broad concept that encompasses an alpha value indicating transparency in addition to RGB values.

Another embodiment of the present invention also relates to an image generating apparatus. An image generating apparatus according to this embodiment comprises: an integrated lookup table formed such that a single storage area is divided into plurality of blocks and individual lookup tables, which store different combinations of reference information related to a texture, are respectively assigned to the plurality of blocks; a reference unit which selectively refers to one of the individual lookup tables in the integrated lookup table so as to acquire the reference information; and an arithmetic unit which uses the reference information acquired by the reference unit to perform arithmetic operation on texture data.

The individual lookup tables may store, for different levels of detail, different combinations of reference information related to the texture, and the reference unit may selectively refer to the individual lookup table corresponding to the level of detail of rendering of an area to be rendered to which the texture data is mapped, by designating the level of detail of rendering of the area to be rendered. The term "area to be rendered" refers to an area of rendering of any size such as a subarea of an object to be rendered, the surface of a polygon in a polygon model and a pixel area of a predetermined size. The term "level of detail of rendering" refers to the level of detail required in rendering a target area.

Still another embodiment of the present invention relates to an image generating method. In this method, a single storage area in an integrated lookup table is divided into a plurality of blocks and individual lookup tables are assigned to the respective blocks. The method comprises switching between the individual lookup tables for reference, by offsetting a reference address in the integrated lookup table.

Yet another embodiment of the present invention relates to an image generating method. An image generating method according to this embodiment comprises: dividing a single storage area of an integrated lookup table into a plurality of blocks, assigning individual lookup tables to the respective blocks, and configuring configuration information related to the assignment to the blocks in a register; determining the location of assignment of a specific individual lookup table by referring to the configuration information related to the assignment to the blocks configured in the register so as to switch between individual lookup tables to be referred to; and referring to the specific individual lookup table so as to acquire reference information necessary to generate an image.

Optional combinations of the aforementioned constituting elements, and implementations of the invention in the form of methods, apparatuses, systems computer programs may also be practiced as additional modes of the present invention.

According to the present invention, high-quality rendering data can be generated at a high speed.

BRIEF DESCRIPTION OF THE DRAWINGS

FIGS. 8A and 8B show color lookup tables for respective LOD.

10 rasterizer, 12 distribution unit, 20 rendering computation unit, 30 shader unit, 32 shader cluster, 36 memory access unit, 40 memory, 50 texture unit, 52 configuration register group, 58 arithmetic unit, 60 storage, 62 texture data, 64 integrated lookup table, 65 individual lookup table, 68 LOD calculating unit, 70 lookup table reference unit, 100 rendering block, 110 control block, 120 input and output block, 130 storage apparatus, 140 display apparatus, 150 bus, 200 image generating apparatus

BEST MODE FOR CARRYING OUT THE INVENTION

First Embodiment

Figure 1:
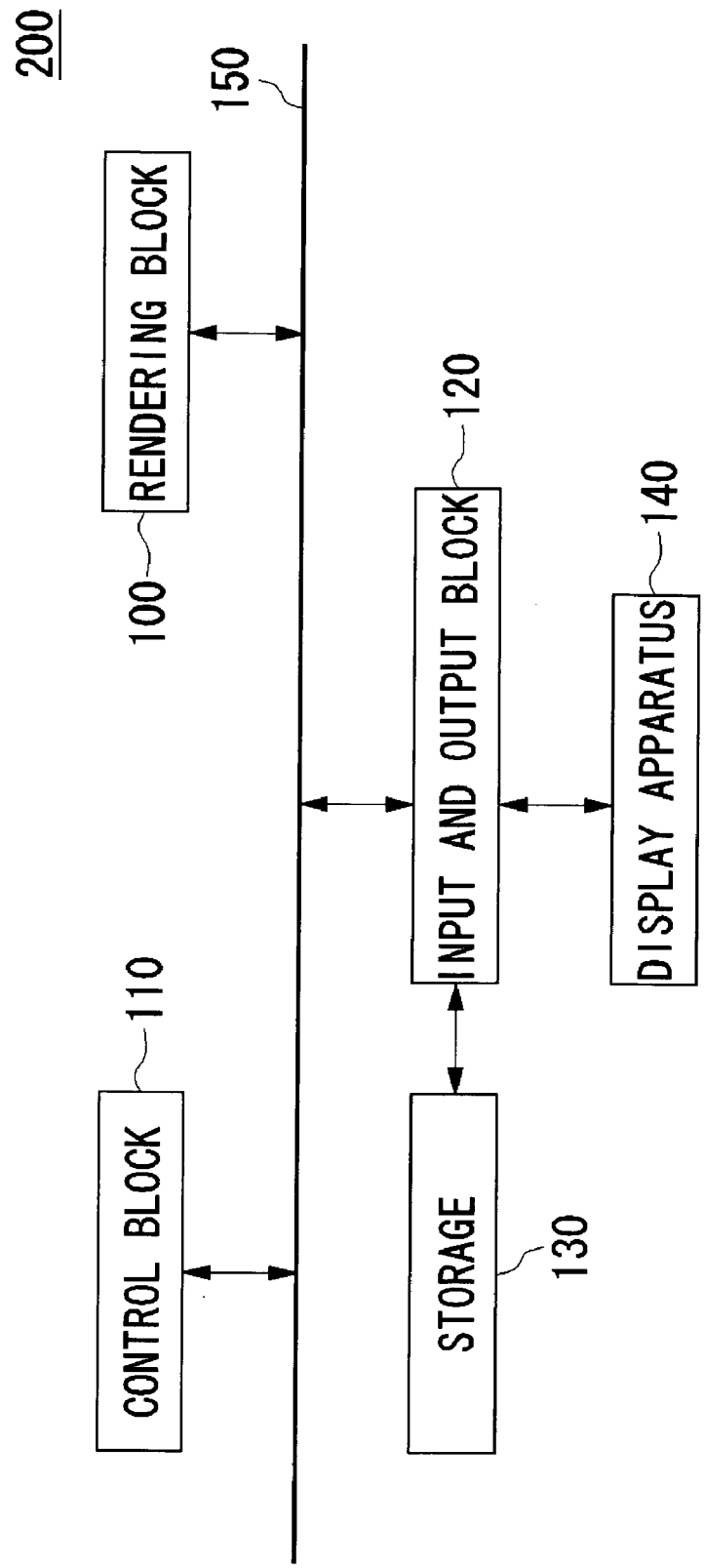
FIG. 1 shows the structure of an image generating apparatus according to an embodiment.

FIG. 1 shows the structure of an image generating apparatus 200 according to a first embodiment of the present invention. The image generating apparatus 200 is comprised of a rendering block 100, a control block 110 and an input and output block 120 connected to each other via a bus 150. A storage apparatus 130 and a display apparatus 140 are connected to the input and output block 120. The input and output block 120 may communicate with another apparatus via a network so as to import data necessary for rendering from an external source.

The control block 110 is a block that controls the entirety of the image generating apparatus 200. The control block 100 manages synchronization of data transfer between the interior of the image generating apparatus 200 and peripheral apparatuses such as the storage apparatus 130 and the display apparatus 140. The control block 110 is also responsible for processing interrupts from the individual units in the image generating apparatus 200, and management of a timer.

The input and output block 120 reads 3D model information and various parameters stored in the storage apparatus 130 and provides the read data to the rendering block 100. The input and output block 120 may receive data necessary for rendering from an external apparatus via the network so as to provide the received data to the rendering block 100. The input and output block 120 displays rendering data output by the rendering block 100 to the display apparatus 140.

The rendering block 100 performs a rendering process for generating rendering data by referring to the 3D model information supplied from the input and output block 120 and for writing the generated data in a frame buffer.

Figure 2:
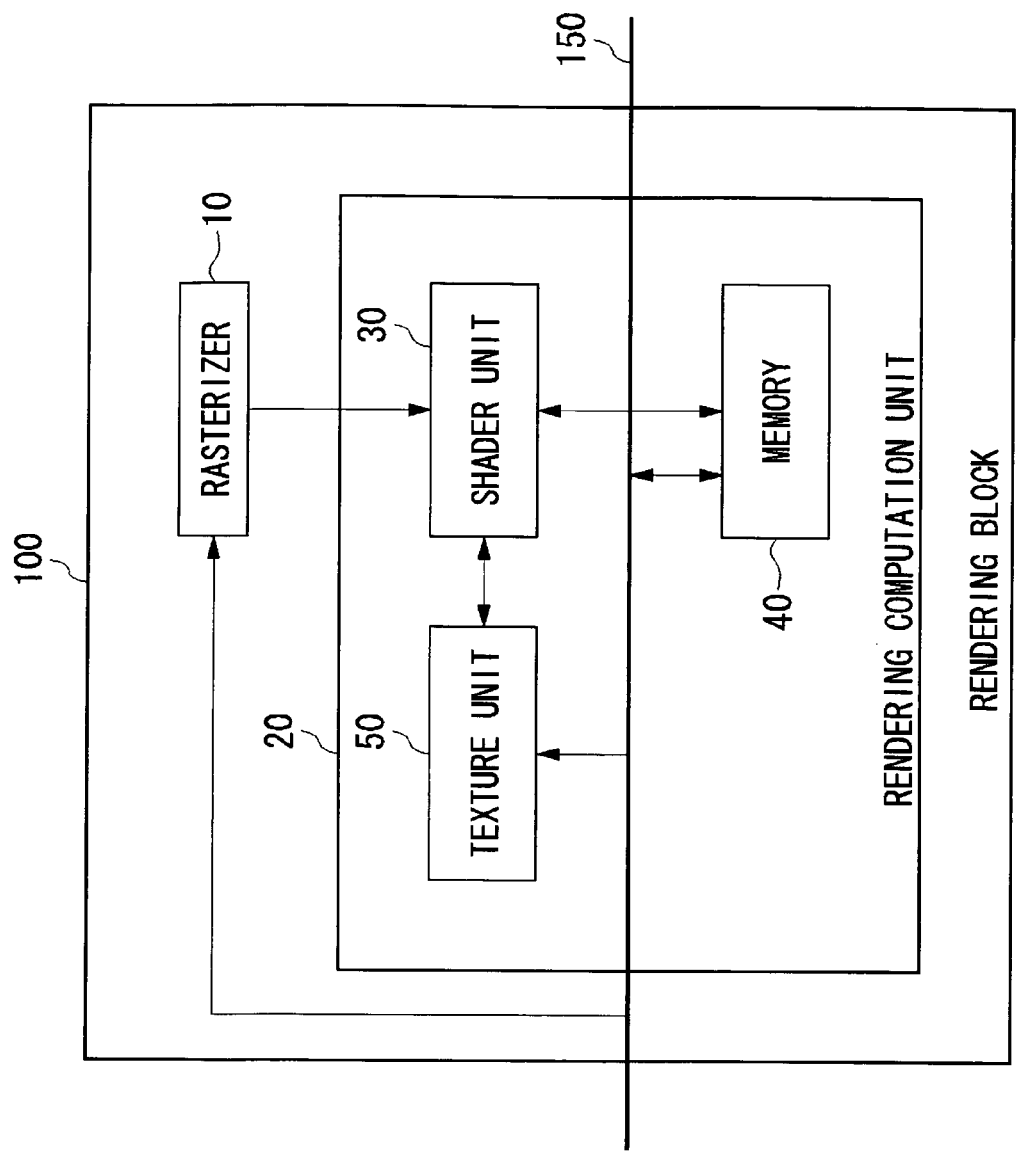
FIG. 2 shows the structure of the rendering block of FIG. 1.

FIG. 2 shows the structure of the rendering block 100. A rasterizer 10 receives vertex data of rendering primitives from the input and output block 120. Generally, a rendering primitive is a triangle. The rasterizer 10 performs a view transform by projective transform of a triangle in the 3D space into a triangle on a rendering plane. Further, the rasterizer 10 performs a rasterizing process for scanning the triangle on the rendering plane in the horizontal direction so as to transform, row by row, the triangle into quantized pixels. The rasterizer 10 develops the rendering primitive into pixels and computes pixel information including RGB color values, an a value and a Z value for each pixel.

The rasterizer 10 generates a pixel area (hereinafter, referred to as an area to be rendered) of a predetermined size along the scan line and supplies the generated area to a rendering computation unit 20 in the subsequent stage. The rendering computation unit 20 includes a shader unit 30, a memory 40 and a texture unit 50. The memory 40 is provided with a frame buffer and a texture buffer. The frame buffer and the texture buffer may be provided in a single memory or in physically separated memories.

The areas to be rendered supplied from the rasterizer 10 to the rendering computation unit 20 are stacked in a queue. The shader unit 30 sequentially processes the areas to be rendered stacked in the queue.

The shader unit 30 performs a shading process by referring to pixel information computed by the rasterizer 10, determines pixel colors after texture mapping by referring to texel information obtained by the texture unit 50, and writes rendering data in the frame buffer in the memory 40. The shader unit 30 further performs processes like fogging and alpha blending on the rendering data held in the frame buffer so as to determine rendering colors ultimately to be reproduced, and updates the rendering data in the frame buffer accordingly. The rendering data stored in the frame buffer are read by the input and output block 120 and output to the display apparatus 140.

The texture unit 50 receives an input of parameters designating texture data from the shader unit 30, computes addresses of the texture data, and requests the texture buffer in the memory 40 to provide necessary texture data. The texture unit 50 caches the texture data read from the texture buffer, performs a filtering process such as bilinear interpolation or trilinear interpolation, and outputs the resultant data to the shader unit 30.

Figure 3:
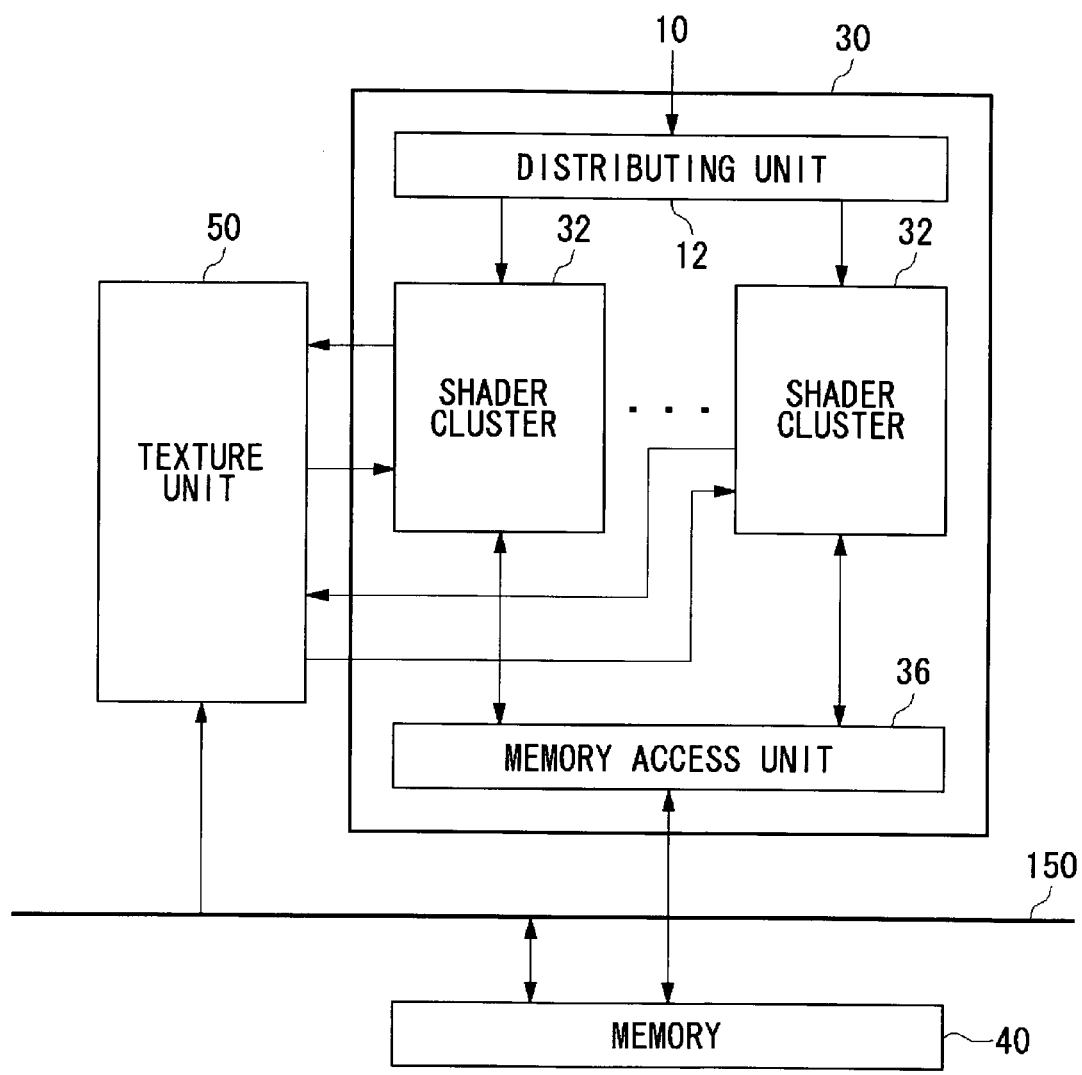
FIG. 3 shows the detailed structure of the rendering operation unit of FIG. 2.

FIG. 3 shows the detailed structure of the rendering computation unit 20. The shader unit 30 in the rendering computation unit 20 is provided with plural shader clusters 32 in non-synchronous operation. The shader clusters 32 execute pixel rendering processes in parallel, by processing pixel data respectively in their charge.

A distribution unit 12 determines the shader cluster 32 in charge of the area to be rendered stacked in the queue, generates associated parameters, and supplies the area to be rendered and the parameters to the shader cluster 32.

One texture unit 50 is provided in the rendering computation unit 20. Each of the shader clusters 32 feeds a texture load command that includes texture parameters designating texture data to the texture unit 50 so as to receive the texture data subjected to texture mapping from the texture unit 50.

The shader cluster 32 performs shading such as flat shading and glow shading, determines color values of the rendered pixels, and writes the determined color values in the frame buffer in the memory 40. Further, the shader cluster 32 blends the color values of texels mapped to the pixels with the color values of the pixels read from the frame buffer, in accordance with the texture data output from the texture unit 50. When the pixel colors, the texel colors, the alpha values and the fog values are determined, the shader cluster 32 writes the data of the pixels to be ultimately rendered in the frame buffer. The memory access unit 36 controls writing and reading of the pixel data to and from the frame buffer by the shader cluster 32.

Since the texture unit 50 performs processes including address computation of texture, memory access and filtering, upon receipt of the texture load command from the shader cluster 32, a comparatively long time is consumed before an output is obtained, as compared to the computation in the shader cluster 32. Accordingly, the shader cluster 32 processes an area to be rendered other than the area to be rendered being processed, after the texture load command is executed, so that the processing efficiency is improved.

Figure 4:
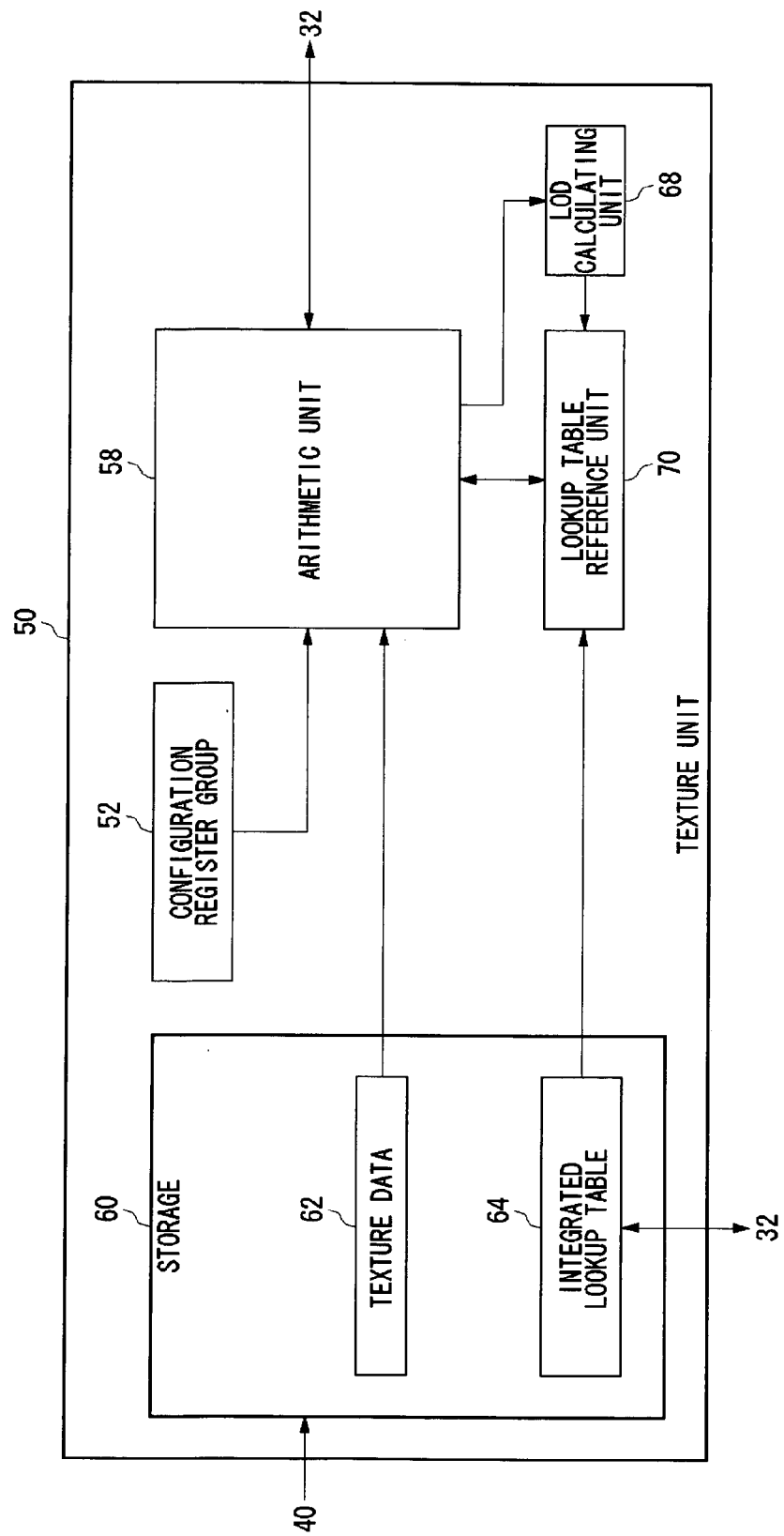
FIG. 4 shows the structure of the texture unit of FIG. 3.

FIG. 4 shows the structure of the texture unit 50. The texture unit 50 computes addresses in the texture buffer by converting texture coordinates into texel coordinates, reads texel information in accordance with the computed addresses, and determines color information of the texels mapped to the pixels by a filtering process such as bilinear filtering. A description will now be given of the structure of the texture unit 50.

A computation unit 58 accepts inputs of a texture load command, a parameter acquisition command from the plurality of shader clusters 32, processes the commands sequentially, and delivers the results of the processes to the shader cluster 32.

A texture load command includes texture parameters designating texture data. The texture parameters include texture coordinates, texel coordinates and a level of detail (LOD) value. The LOD value is calculated by the shader cluster 32. To differentiate it from the LOD value calculated in the texture unit 50, the LOD value supplied by the shader cluster 32 will be referred to as an externally input LOD value, and the LOD value calculated in the texture unit 50 will be referred to as an internally generated LOD value.

The externally input LOD value may or may not be given as a texture parameter. The externally input LOD value may be given for each rendered object or for each pixel. In case the externally input LOD value is given, the externally input LOD value is used in preference to the internally generated LOD value. The internally generated LOD value is determined by the gradient of the surface of a polygon to which a texture is mapped, as will be described below. The internally generated LOD value is in accordance with the depth of a texel. Generally, the more distant an object, the lower the level of detail in rendering a texture. There are cases, however, in which a distant object is rendered with a greater level of detail. In that case, the externally input LOD value may be supplied so that it is used in preference to the internally generated LOD value. Hereinafter, the internally generated LOD value will simply be referred to as an LOD value unless it is expected to generate confusion.

A configuration register group 52 is a set of configuration registers for holding various configuration information defining the operation of the texture unit 50 as configuration information. Since the configuration register group 52 holds the configured value, there is no need for reconfiguration if the same mode or condition continues to be used as previously. In addition to registers for holding operation modes and parameters referred to in using a texture, the configuration register group 52 also includes registers for holding a flag referred to in using an integrated lookup table 64 described later, a base address in the integrated lookup table 64, and information related to the location to which individual color lookup tables in the table are assigned and the format of assignment.

The arithmetic unit 58 performs a filtering process such as bilinear interpolation on texture data, based upon the information stored in the configuration register group 52.

The storage 60 stores texture data 62 and the integrated lookup table 64. The storage 60 is used as a buffer for holding the integrated lookup table 64 and the texture data 62 read from the memory 40. The storage 60 supplies the texture data 62 to the arithmetic unit 58 in response to a request from the arithmetic unit 58. Alternatively, the arithmetic unit 58 may directly read the texture data 62 from the texture buffer in the memory 40 without the intervention of the storage 60.

In addition to being used as a color lookup table (CLUT) for storing indexes indicating color information of texels, the integrated lookup table 64 may be used as a general-purpose lookup table (LUT) for storing other indexed information as necessary. The color lookup table is referred to by a lookup table reference unit 70. If the integrated lookup table 64 is used as a general-purpose lookup table, the shader cluster 32 may directly refer to the lookup table.

The texture data does not comprise color values of texels directly but comprises color indexes as texel values. This allows efficient compression of texture data. Information on color values corresponding to the index values is stored in the integrated lookup table 64 as reference information and supplied upon request. The integrated lookup table 64 stores plural color lookup tables in which entries describing color information are organized by the index number.

The arithmetic unit 58 supplies the index values of texels to the table reference unit 70 in order to convert the texel colors provided in the index format into actual color values. The lookup table reference unit 70 refers to the integrated lookup table 64 so as to acquire color information corresponding to the index values of texels and outputs the information to the arithmetic unit 58.

Figure 5:
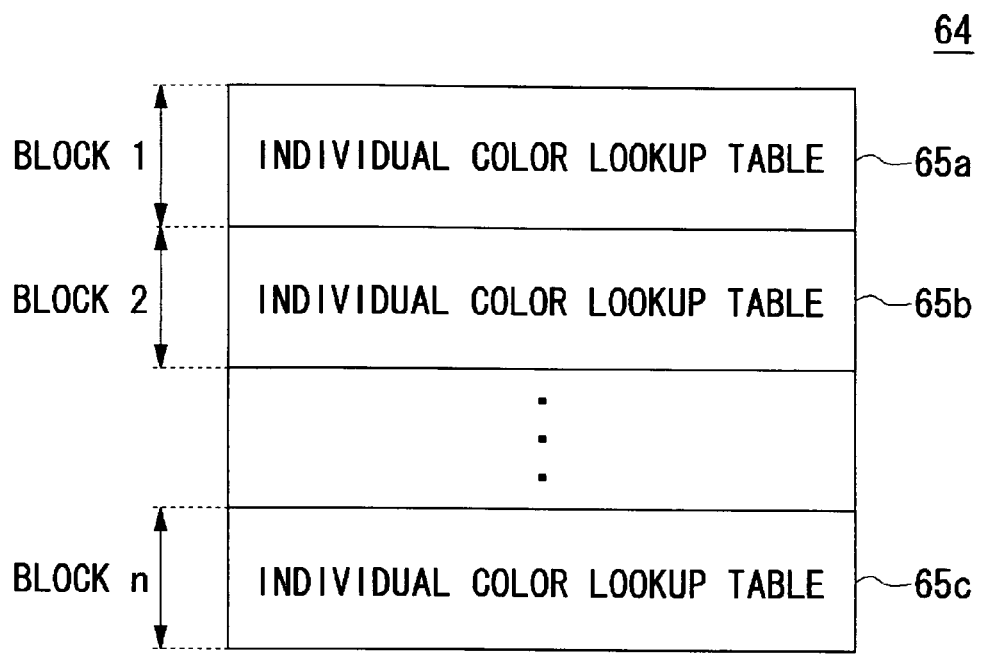
FIG. 5 shows the configuration of the integrated lookup table of FIG. 4.

FIG. 5 shows the configuration of the integrated lookup table 64. The integrated lookup table 64 is formed such that a single storage area is divided into plural blocks respectively storing individual lookup tables 65a-65c (hereinafter, generically referred to as individual lookup tables 65). The lookup table reference unit 70 is operable to selectively refer to one of the plural individual lookup tables 65 in the integrated lookup table 64 by designating a block number.

Information related to the location of assignment to each block in the storage area of the integrated lookup table 64 is configured in a predetermined register in the configuration register group 52. The location of assignment is given as an offset between a base address in the storage area of the integrated lookup table 64 and the head address of each block. The lookup table reference unit 70 acquires information related to the location of assignment configured in a predetermined register in the configuration register group 52. The lookup reference unit 70 then calculates the reference address of the individual lookup table 65 designated by the block number so as to refer to the designated individual lookup table 65 by referring to the reference address.

An LOD calculating unit 68 acquires, from the arithmetic unit 58, information on the coordinate values (u, v) of the texel and the coordinate values (x, y) of the pixel to which the texel is mapped. The LOD calculating unit 68 calculates the LOD value indicating the level of detail in rendering the texel, in accordance with local change in the texel coordinates of the texture with respect to local change in the pixel coordinates. The method of calculating the LOD value will now be described.

Figure 6:
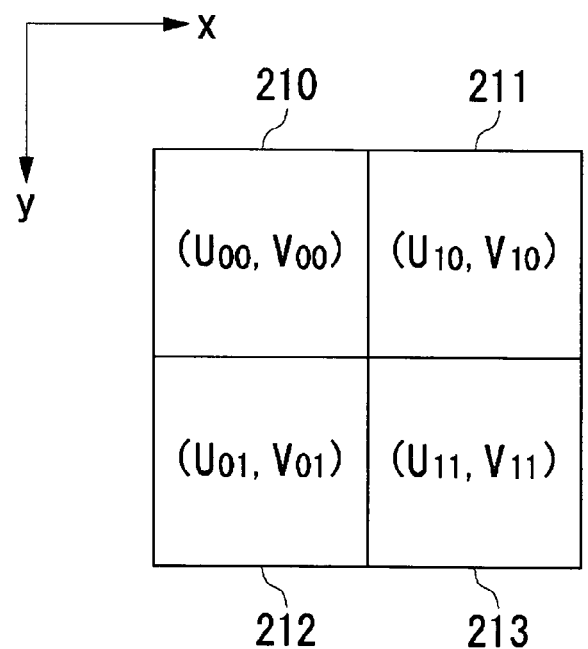
FIG. 6 shows texels mapped to pixels.

FIG. 6 shows texels mapped into pixels. It will be assumed that texel coordinates (U00, V00) are mapped to a first pixel 210 in an image area of 2 by 2 pixels. Similarly, it will be assumed that texel coordinates (U10, V10) are mapped to a second pixel 211, texel coordinates (U01, V01) are mapped to a third pixel 212, and texel coordinates (U11, V11) are mapped to a fourth pixel 213.

The LOD calculating unit 68 uses the following expressions to determine the amount of change du/dx, du/dy, dv/dx, dv/dy in the texel coordinates (u, v) with respect to the change in the pixel coordinates (x, y):

$$du/dx=(f(U10-U00)+f(U11-U01))*0.5,$$

$$du/dy=(f(U01-U00)+f(U11-U10))*0.5,$$

$$dv/dx=(f(V10-V00)+f(V11-V01))*0.5,$$

$$dv/dy=(f(V01-V00)+f(V11-V10))*0.5.$$

It will be noted that $f(x)=|x|$ or $f(x)=x$. In the former case, the functions in the above expressions give absolute values of differences from an adjacent pixel in respect of texel coordinates. In the latter case, the function merely gives differences. The configuration in the configuration register group 52 determines whether to produce absolute values.

For LOD calculation by the LOD calculating unit 68, isotropic filter calculation and anisotropic filter calculation are available. For isotropic filter calculation, a calculation mode based upon Euclidean distance and a calculation mode based upon Manhattan distance are available. The configuration in the configuration register group 52 allows switching between the two modes.

According to a Euclidean distance based mode of calculation using an isotropic filter, the LOD value is calculated by the following expressions:

$$Px=[(du/dx)^2+(dv/dx)^2]^{1/2}$$

$$Py=[(du/dy)^2+(dv/dy)^2]^{1/2}$$

$$LOD=K+\log_2(\max(Px, Py)),$$

where K is a bias which is determined depending on the distance from the viewpoint to a rendering primitive to which the texture is mapped. The above calculation allows the LOD value to accommodate the gradient in the rendering primitive to which the texture is mapped.

According to a Manhattan distance based mode of calculation using an isotropic filter, the LOD value is calculated by the following expressions:

$$Px=abs(du/dx)+abs(dv/dx),$$

$$Py=abs(du/dy)+abs(dv/dy),$$

$$LOD=K+\log_2(\max(Px, Py)),$$

where abs( ) is a function that returns an absolute value of the argument.

In a mode of calculation using an anisotropic filter, the LOD is value is calculated by the following expressions:

$$Px=abs(du/dx)+abs(dv/dx),$$

$$Py=abs(du/dy)+abs(dv/dy),$$

$$Pmax=\max(Px,Py),$$

$$Pmin=\min(Px,Py),$$

$$Anisotropy=\min(ceil(Pmax/Pmin), MAXTAP),$$

$$LOD=K+\log_2(Pmax/Anisotropy),$$

where ceil( ) is a function that returns a minimum integer which is equal to or greater than the argument, and MAXTAP denotes the maximum number of taps.

Figure 7:
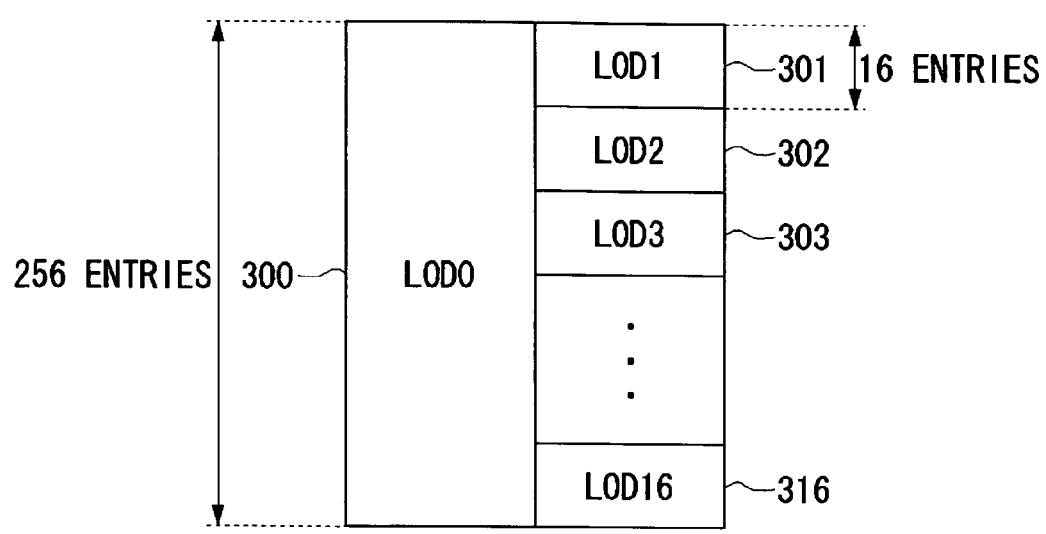
FIG. 7 shows an integrated lookup table storing color lookup tables provided for respective LOD.

FIG. 7 shows an example of the integrated lookup table 64 storing plural color lookup tables provided for respective LOD. The storage area of the integrated lookup table 64 is divided into, for example, 17 blocks. Color lookup tables provided for respective LOD are assigned to the respective blocks. Referring to FIG. 7, LOD0-LOD16 indicate LOD values. The greater the suffix number, the lower the level of detail. A color lookup table 300 for LOD0 capable of storing 256 entries of color value is assigned to the first block. Color lookup tables 301-316 for LOD1-LOD16, respectively, each capable of storing 16 entries of color value are assigned to the second through seventeenth block. Correspondence between the blocks and the LOD values is configured in the configuration register group 52.

FIGS. 8A and 8B show color lookup tables stored in the integrated lookup table 64 for respective LOD. FIG. 8A shows a color lookup table 300 for LOD0 storing 256 entries $(R_1, G_1, B_1, \alpha_1)$-$(R_{256}, G_{256}, B_{256}, \alpha_{256})$, wherein a set of color values $(R, G, B, \alpha)$ comprising RGB values and an $\alpha$ value forms an entry. FIG. 8B shows a color lookup table 301 for LOD1 storing 16 entries $(R_1, G_1, B_1, \alpha_1)$-$(R_{16}, G_{16}, B_{16}, \alpha_{16})$. Different color lookup tables store entries of different color values. Each of the color lookup tables provided for the respective LOD is used as a color palette storing different color values depending on the level of detail.

The integrated lookup table 64 may be configured in various other ways. For example, the integrated lookup table 64 may be configured such that the number of entries in a color lookup table is reduced as the LOD value is increased or the level of detail is reduced.

The LOD calculating unit 68 supplies the LOD value calculated to the lookup table reference unit 70. The lookup table reference unit 70 identifies a color lookup table in the integrated lookup table 64 to be referred to, by referring to the LOD value supplied from the LOD calculating unit 68. More specifically, the lookup table reference unit 70 determines a block number from the LOD value, by referring to the configuration information in the configuration register group 52. The lookup table reference unit 70 then determines the reference address of the block, by adding the offset address of the block to the base address of the integrated lookup table 64.

In accordance with the reference address of the block, the lookup table reference unit 70 selects in the integrated lookup table 64 a color lookup table corresponding to the LOD value supplied from the LOD calculating unit 68. The lookup table reference unit 70 uses the index value of the texel as an offset from the reference address so as to read the color value corresponding to the index value from the color lookup table thus selected. In this way, the texel value given in the index format is converted into the actual color value and is supplied to the arithmetic unit 58.

Figure 9:
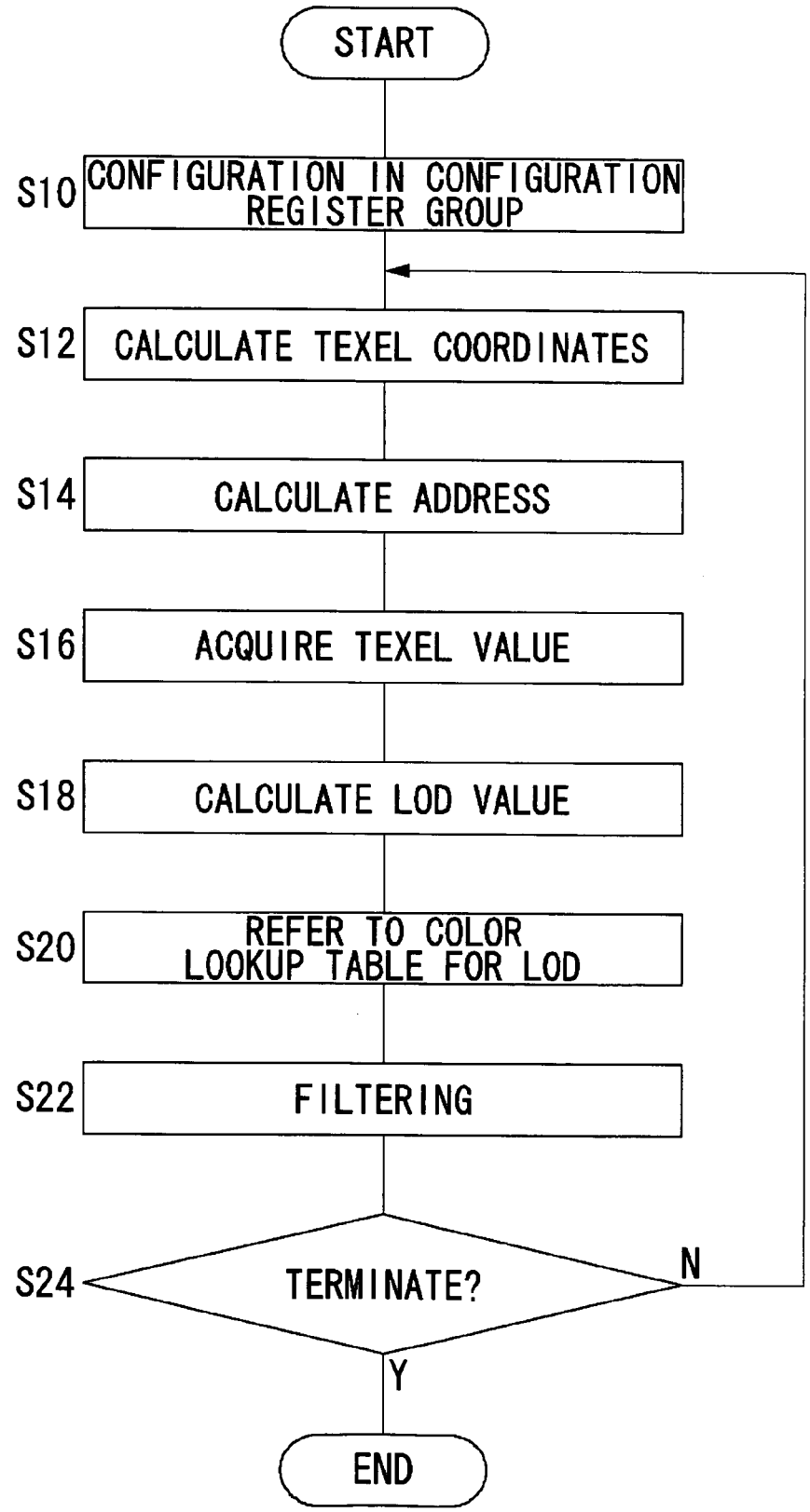
FIG. 9 is a flowchart showing how the texture unit according to the embodiment processes texture mapping.

FIG. 9 is a flowchart showing how the texture unit 50 processes texture mapping.

Prior to a texture mapping process, configuration information such as the operating mode and various parameters of the texture unit 50 are configured in the configuration register group 52 (S10).

The arithmetic unit 58 acquires texture coordinates (s, t) from the texture load command and calculates texel coordinates (u, v) by multiplying the texture coordinates thus acquired by a texture size (S12). Subsequently, the arithmetic unit 58 calculates an address for referring to the texture data in the storage 60 in accordance with the texel coordinates (S14).

The arithmetic unit 58 refers to the texture data 62 in the storage 60 so as to acquire the texel value located in the calculated address (S16). The texture data 62 is given in the indexed color format so that the texel value is given in the form of by an index number. The LOD value calculating unit 68 calculates the LOD value for the texel according to the method described above (S18).

The lookup table reference unit 70 refers to the integrated lookup table 64 and select a color lookup table corresponding to the LOD value thus calculated. The lookup table reference unit 70 then acquires from the selected color lookup table the color value corresponding to the index number of the texel (S20). The arithmetic unit 58 subjects the texel color value thus acquired to filtering such as bilinear interpolation, in accordance with the operating mode (S22).

Control is then returned to step S12 so that the steps S12-S22 are continued until the texture mapping process is completed (N in S24). When the texture mapping process in the area to be rendered is completed (Y in S24), the process is terminated.

In step S20, different color lookup tables in the integrated lookup table 64 are referred to depending on the LOD value. In this process, reconfiguration of the configuration register group 52 is not required. This is because the integrated lookup table 64 stores plural color lookup tables and the base address of the integrated lookup table 64 remains unchanged. The color lookup table to be referred to can be replaced one by another merely by offsetting the base address of the integrated lookup table 64. That is, the configuration in the configuration register group 52 established in step S10 can continue to be used without requiring any change. This will reduce overhead due to context switching. Texture mapping can be performed by appropriate switching between color lookup tables in accordance with the LOD value.

The present embodiment allows switching between color lookup tables in accordance with the gradient of the surface of a polygon on which the texture is mapped. For example, a color lookup table with a relatively small number of colors is applied to a texel at a position remote from a viewpoint so that the texel color is determined with a decreased level of detail. To a texel near the viewpoint, a color lookup table with a relatively large number of colors is applied so that the texel color is determined with an increased level of detail. In this way, the rendering quality of the texture is maintained. By using a color lookup table with a smaller number of colors to a texel with a decreased level of detail, efficiency in compression of texture data in the index format is improved.

The configuration register group 52 holds information relating to the location of assignment of the individual color lookup tables in the integrated lookup table 64 as well as other information. Therefore, a color lookup table associated with an LOD value can be selectively referred to merely by changing the reference address in the integrated lookup table 64. No change is required in the context (configuration information) in the configuration register group 52. Thus, a texel color can be determined without requiring context switching, by switching between color palettes with a high granularity in accordance with a change in LOD value of the surface to which the texture is mapped. Because processing efficiency is not reduced by frequently switching between color palettes, rendering quality is improved while maintaining processing speed.

The texture unit 50 is described above as using a 2D texture as texture data. Alternatively, the texture unit 50 may use a 3D multi-layered structure comprising plural 2D textures in a layered structure.

Figure 10:
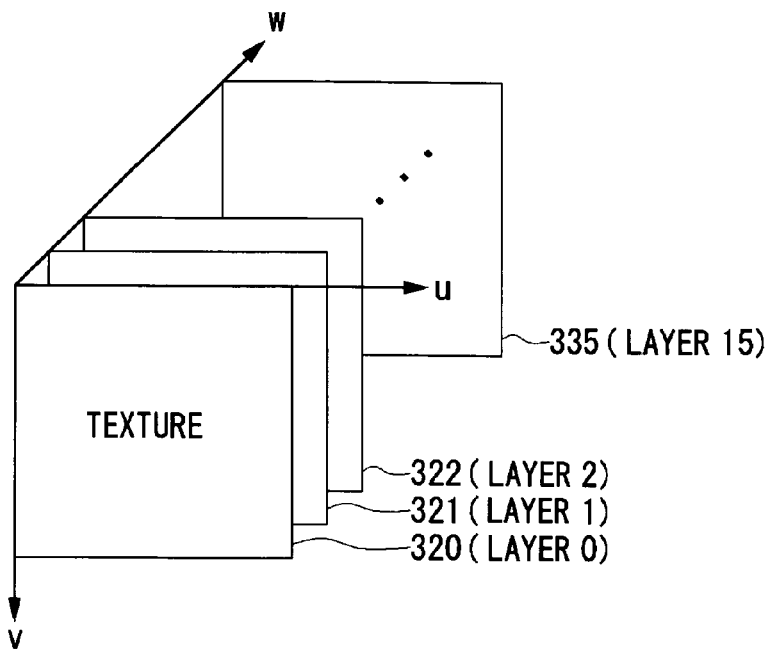
FIG. 10 shows the configuration of a 3D multi-layered texture.

FIG. 10 shows the configuration of a 3D multi-layered texture 350. The 3D multi-layered texture 350 is defined by (u, v, w) coordinates and comprises a stack of plural 2D textures defined by (u, v) coordinates in the direction of w axis. In the illustrated example, plural 2D textures 320-335 (layer 0-layer 15) form a layered structure in the w-axis direction. By designating a layer value which denotes a w value, the 2D texture in one of the layers can be selectively referred to.

Figure 11:
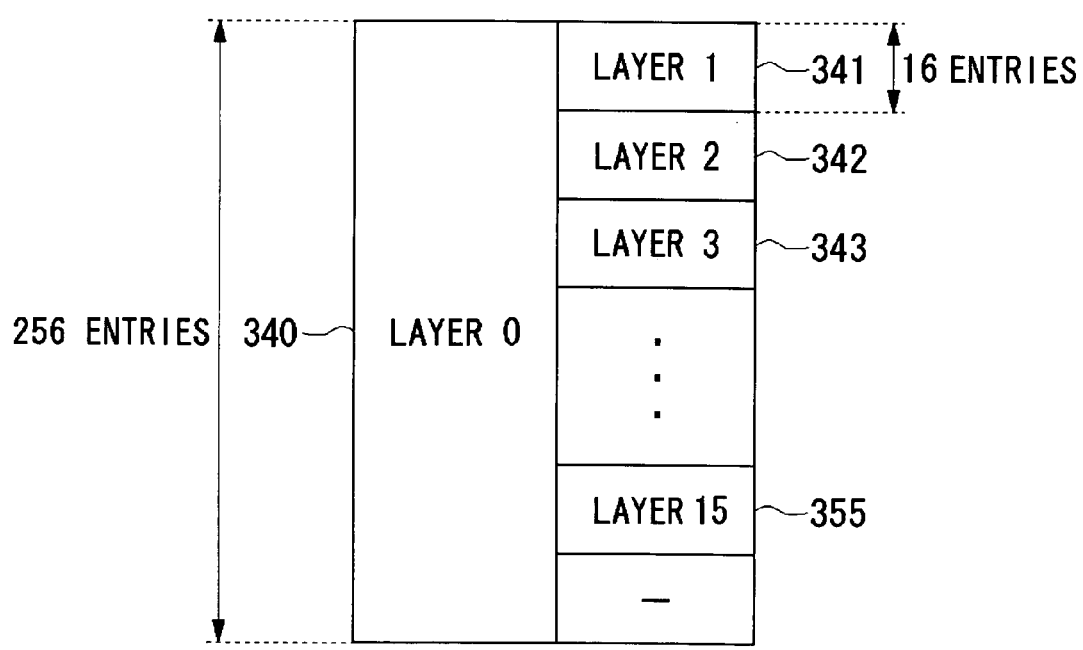
FIG. 11 shows the configuration of an integrated lookup table storing color lookup tables provided for respective layers of the 3D multi-layered texture.

FIG. 11 shows the configuration of the integrated lookup table 64 storing color lookup tables provided for respective layers. In association with the layers of the 3D multi-layered texture 350 of FIG. 10, the integrated lookup table 64 includes a color lookup table 340 for layer 0 storing 256 entries and also includes color lookup tables 341-355 for layer 0-layer 15 each storing 16 entries.

The configuration facilitates the reference to a texture in a 3D multi-layered structure without requiring context switching, by allowing switching between color lookup tables provided for respective layers. As such, the configuration helps reduce processing cost.

Further, the texture unit 50 is also capable of mipmapping, by using, as texture data, a mipmap texture that includes plural 2D textures of different levels of resolution.

Figure 12:
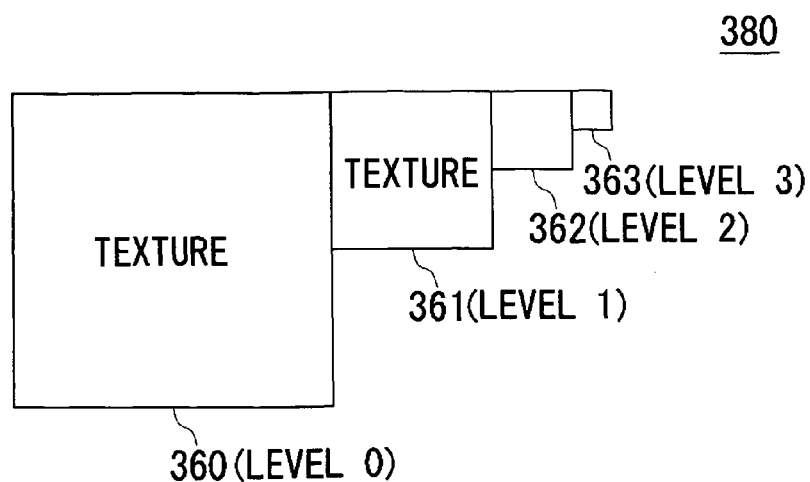
FIG. 12 shows the configuration of a mipmap texture.

FIG. 12 shows the configuration of a mipmap texture 380. The mipmap texture 380 contains plural textures with different levels of resolution, each of which has been made available by reducing a texture in size by filtering. In the illustrated example, the configuration of a mipmap texture is shown comprising a texture 360 of level 0, a texture 361 of level 1, a texture 362 of level 2 and a texture 363 of level 3 in the descending order of levels of resolution. In mipmapping, a mipmap level is designated at the time of texture mapping. A texture compatible with the resolution of a polygon is selected and mapped to the surface of the polygon.

Figure 13:
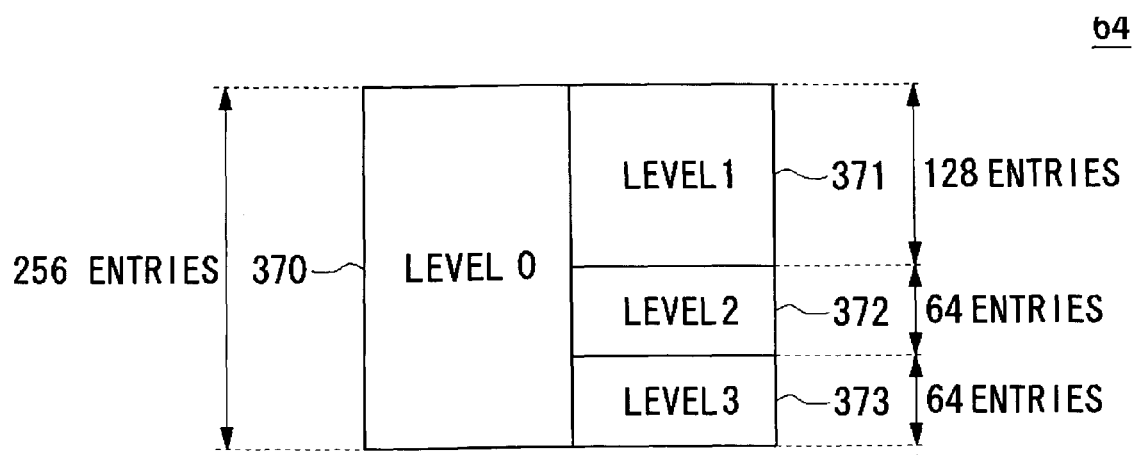
FIG. 13 shows an integrated color lookup table storing color lookup tables for respective levels of resolution of mipmap texture.

FIG. 13 shows the configuration of the integrated lookup table 64 storing color lookup tables provided for respective levels of resolution. In association with the levels of resolution in the mipmap texture 380 of FIG. 12, the integrated lookup table 64 includes a color lookup table 370 for level 0 storing 256 entries, a color lookup table 371 for level 1 storing 128 entries, a color lookup table 372 for level 3 storing 64 entries and a color lookup table 373 for level 3 storing 64 entries.

In texture mapping where the arithmetic unit 58 uses a texture 360 of level 0 in the mipmap texture 380, the lookup table reference unit 70 refers to the color lookup table 370 for level 0 in the integrated lookup table 64 so as to convert a texel value in the index format into a color value. Similarly, if the arithmetic unit 58 performs texture mapping by using a texture 361 of level 1 in the mipmap texture 380, the lookup table reference unit 70 refers to the color lookup table 371 for level 1. Thus, the lookup table reference unit 70 selectively refers to a color lookup table in the integrated lookup table 64, which is compatible with the level in the mipmap texture 380, so as to convert a texel level in the index format into a color value.

This will allow selectively referring to a color lookup table in the integrated lookup table 64 compatible with the mipmap level without requiring overhead due to context switching and will achieve efficient processing as a result.

The description of the invention given above is based upon an embodiment. The embodiment is illustrative in nature and various variations in constituting elements and processes involved are possible. Those skilled in the art would readily appreciate that such variations are also within the scope of the present invention.

Some examples of such variations will be described below. Each shader cluster 32 of the shader unit 30 may include plural shader pipes for synchronized parallel processing of pixel data. The configuration allows pipeline processing of pixel data within the rendering computation unit 20.

The integrated lookup table 64 is described above as an example of the structure whereby the texture unit 50 refers to color palettes texel by texel. The lookup table may be provided with information other than color information. For example, information on a vector normal to the surface to which a texture is mapped may be indexed so that the information on the normal vector may be stored in the lookup table, organized by the index. The information on the normal vector is used in bump mapping. The values of representative points of a nonlinear mathematical function may be indexed so that the values of representative points are stored in the lookup table, organized by the index. In this case, the shader cluster 32 refers to the lookup table to acquire the coordinate values of representative points and determines a function value by appropriately interpolating between the representative points.

A color lookup table is described above as storing entries of color values organized by the index. Alternatively, a color lookup table may store correspondence between index values and color values. In this case, the lookup table reference unit 70 searches the color lookup table by using the index value of a texel as a key, so as to acquire a color value corresponding to the index value. Alternatively, the color lookup table may be configured as a hash table. In this case, the lookup table 70 searches the color lookup table by using the hash of the index value.

In a mipmap texture, each of the textures of the respective levels may be formed as a 3D multi-layered texture. In this case, the integrated lookup table 64 may have a nested structure such that there are included color lookup tables for respective mipmap levels and each color lookup table includes color lookup tables for plural layers. The lookup table reference unit 70 is capable of selectively refer to a specific color lookup table in the integrated lookup table 64 by designating a combination of a mipmap level and a layer.

Described above in the embodiment is pixel processing such as texture mapping in which a lookup table is used. The lookup table configured similarly as described may also be used in geometric computation. For example, the present invention may be applicable to a lookup table referred to in displacement mapping. Unlike bump mapping which gives what appears to be roughness to the surface of a polygon in the process of rendering, displacement mapping deforms the surface of a polygon by directly manipulating vertex data in the process of geometric computation. More specifically, displacement mapping maps vertex information representing roughness to a polygon model. By mapping normal data to the surface of a base polygon, coordinate values of vertices undergo changes in the normal direction so that a complex form is generated. For use in displacement mapping, lookup tables provided for respective LOD may store vertex information so that different lookup tables may be switched into use according to the LOD value.

Industrial Usability

The present invention is applicable to the field of a graphic process.

The invention claimed is:

1. An image generating apparatus comprising:
a storage area, including an integrated lookup table area divided into a plurality of blocks forming an integrated lookup table with a plurality of individual color lookup tables with different color palettes being respectively and adjacently assigned to the plurality of blocks;
a configuration register group, in which configuration information related to a block number specifying the location where each block is assigned in the integrated lookup table is stored in a predetermined register among a plurality of registers contained in the configuration register group; and
a reference unit, which receives the texel coordinate representing a specified color index from an arithmetic unit through a load command input to the arithmetic unit and which converts the color index specified into an actual color value,
wherein, when any one of blocks in the integrated lookup table is specified by the block number, the reference unit acquires from the predetermined register the location where the specified block is assigned in the integrated lookup table, and selectively refers to the specific individual color lookup table in the integrated lookup table by directly referring to the location acquired from the predetermined register so as to acquire color reference information using the color index received, so as to convert the color index into the actual color value, and
wherein the specific individual color lookup table may be maintained for referencing upon the arithmetic unit receiving further load commands unless otherwise indicated by the configuration register group.

2. The image generating apparatus according to claim 1, wherein
each of the plurality of individual color lookup tables stores the color reference information of color values organized by the color index number, and the reference unit acquires the color reference information corresponding to a designated color index number from the individual color lookup tables.

3. The image generating apparatus according to claim 1, wherein
the plurality of blocks are associated with different levels of detail of rendering, and the reference unit acquires the location of assignment corresponding to the level of detail of rendering of an area to be rendered, and selectively refers to the individual color lookup table corresponding to the level of detail of rendering of an area to be rendered, in accordance with the reference address configured in accordance with the location of the assignment.

4. The image generating apparatus according to claim 3, wherein the number of information items constituting the color reference information stored in the plurality of individual color lookup tables varies depending on the level of detail of rendering.

5. The image generating apparatus according to claim 1, wherein the color reference information is color values.

6. An image generating apparatus comprising:
a storage area, including an integrated lookup table area divided into plurality of blocks forming an integrated lookup table with a plurality of individual color lookup tables having different color palettes and adjacently storing different combinations of color reference information related to a texture being respectively assigned to the plurality of blocks;
an arithmetic unit, to which a load command is input;
a reference unit, which receives from the arithmetic unit the texel coordinate given in the load command representing a specified color index and which acquires a block number specifying the location of assignment of a specific individual color lookup table in accordance with configuration information related to the assignment to the plurality of blocks in the integrated lookup table, and converts the color index specified into an actual color value by selectively referring to the specific individual color lookup table, the reference address being configured in accordance with the location of assignment, so as to acquire the color reference information using the color index received;
wherein the arithmetic unit uses the color reference information of the color value acquired by the reference unit to perform arithmetic operation on texture data, and
wherein the specific individual color lookup table may be maintained for referencing upon the arithmetic unit receiving further load commands unless otherwise indicated.

7. The image generating apparatus according to claim 6, wherein each of the plurality of individual color lookup tables stores, for different levels of detail, different combinations of color reference information of color values related to the texture, and
the reference unit selectively refers to the individual color lookup table corresponding to the level of detail of rendering of an area to be rendered to which the texture data is mapped, by designating the level of detail of rendering of the area to be rendered.

8. The image generating apparatus according to claim 7, further comprising a level of detail calculating unit which calculates the level of detail of rendering of the area to be rendered to which the texture data is mapped, in accordance with local change in texel coordinates of the texture with respect to local change in pixel coordinates.

9. The image generating apparatus according to claim 6, wherein the texture data comprises a plurality of textures of different layers, the individual color lookup tables store, for different layers, different combinations of color reference information of color values related to the textures, and the reference unit designates the layer of the texture used in the arithmetic unit so as to selectively refer to the individual color lookup table corresponding to the designated layer.

10. The image generating apparatus according to claim 6, wherein the texture data comprises a plurality of textures of different levels of resolution, the individual color lookup tables store, for different levels of resolution, different combinations of color reference information of color values related to the textures, and the reference unit designates the level of resolution of the texture used in the arithmetic unit so as to selectively refer to the individual color lookup table corresponding to the designated level of resolution.

11. The image generating apparatus according to claim 6, wherein each of the plurality of individual color lookup tables stores color information organized by the color index number, and the reference unit converts information related to a texel color and supplied in the color index format into color information, by acquiring, from the individual color lookup table, the color information of a color value corresponding to the color index number designated by the arithmetic unit.

12. An image generating method performed by a computer, wherein a single storage area includes an integrated lookup table area divided into a plurality of blocks forming an integrated lookup table with a plurality of individual color lookup tables with different color palettes being adjacently assigned to the respective blocks, the method comprising:

providing by the computer a configuration register group, which stores configuration information related to a block number specifying the location where each block is assigned in the integrated lookup table is stored in a predetermined register among a plurality of registers contained in the configuration register group;

receiving, by the computer, a load command with a texel coordinate representing a specified color index to convert the specified color index into an actual color value;

acquiring by the computer, when any one of blocks in the integrated lookup table is specified by the block number, from the predetermined register the location where the specified block is assigned;

selectively referring by the computer to the specific individual color lookup table in the integrated lookup table by directly referring to the location acquired from the predetermined register so as to acquire color reference information using the color index received to convert the color index into the actual color value, and maintaining the specific individual color lookup table for referencing upon receiving further load commands unless otherwise indicated by the configuration register group.

13. The image generating method according to claim 12, wherein each of the plurality of individual color lookup tables store the reference information necessary to generate an image for respective levels of detail, and the individual color lookup table corresponding to the level of detail of an area to be rendered is selectively referred to by offsetting the reference address.

\* \* \* \* \*